United States Patent [19]

Anderson et al.

[11] Patent Number: 5,226,058
[45] Date of Patent: Jul. 6, 1993

[54] SPREAD SPECTRUM DATA PROCESSOR CLOCK

[75] Inventors: Mark V. Anderson, Fort Worth, Tex.; Michael P. Holmans; Bruce D. Oberlies, both of Coral Springs, Fla.

[73] Assignee: Motorola, Inc., Schaumburg, Ill.

[21] Appl. No.: 767,440

[22] Filed: Sep. 30, 1991

[51] Int. Cl.$^5$ ............................................. H04L 9/00
[52] U.S. Cl. ..................................................... 375/1
[58] Field of Search ............................. 375/1; 364/717

[56] References Cited

U.S. PATENT DOCUMENTS

| | | |
|---|---|---|
| 3,404,229 | 10/1968 | Downey et al. |
| 3,947,634 | 3/1976 | Betts ............................................. 375/1 |
| 4,101,834 | 7/1978 | Stutt et al. |
| 4,351,064 | 9/1982 | Ewanus ......................................... 375/1 |
| 4,535,466 | 8/1985 | Palvolgyi ..................................... 364/717 |
| 4,543,657 | 9/1985 | Wilkinson ..................................... 375/1 |
| 4,639,932 | 1/1987 | Schiff ............................................. 375/1 |
| 4,669,089 | 5/1987 | Gahagan et al. .............................. 375/1 |
| 4,688,257 | 8/1987 | Erickson ....................................... 380/48 |
| 4,799,259 | 1/1989 | Ogrodski ...................................... 364/717 |
| 4,817,113 | 2/1989 | Lundquist et al. ............................ 375/1 |
| 4,995,030 | 2/1991 | Helf ............................................. 370/32.1 |
| 5,084,913 | 1/1992 | Kingston et al. ............................. 375/1 |
| 5,093,841 | 3/1992 | Vancraeynest ............................... 375/1 |

Primary Examiner—Salvatore Gangialosi
Attorney, Agent, or Firm—Raymond J. Warren

[57] ABSTRACT

A noise signal is obtained from a data processor output, such as a data line, an address line, or a control line, and used to control the frequency modulation of an oscillator. The modulated output is used to clock the data processor.

12 Claims, 1 Drawing Sheet

SPREAD SPECTRUM DATA PROCESSOR CLOCK

FIELD OF THE INVENTION

The present invention relates, in general, to a data processor clock and, more particularly, to a spread spectrum data processor clock.

BACKGROUND OF THE INVENTION

In the radio frequency (RF) communication area, a self quieting problem exists when a data processor is utilized. The problem is that the data processor generates a system clock that is a pulse train having harmonics of its fundamental frequency. These harmonics radiate from the data processors section of the circuitry into sensitive receiver sections. This causes the self quieting problem.

The self quieting problem occurs when frequency modulation (FM) receiving equipment locks onto a channel which is on the same frequency as a harmonic of the fundamental clock frequency. The clock harmonic over powers the received signal in this case, giving the impression of a busy channel with a dead carrier being received (quiet). This is especially detrimental to the carrier detecting channel scan systems which will stop on clock harmonics instead of valid busy channels.

There are currently three solutions to this self quieting problem: grounding and shielding of unwanted radiation, clock frequency shifting, and frequency spreading. Grounding and shielding accomplish an attenuation by blocking and/or shorting the interference. While grounding and shielding function adequately, a high degree of attenuation generally requires relatively expensive parts and a great deal of manufacturing time. This adds significantly to the cost of the final product.

The second alternative of clock frequency shifting moves the problematic harmonics out of the receiver input range selectively such that each desired receive frequency requires custom configuration of a multi-frequency clock generator. This requires preprogramming of the system which requires that channel operations of the system be known in advance. Clock frequency shifting effectively moves the problem to another frequency and does not accomplish interference power reduction.

The third alternative of frequency spreading involves clocking the data processor by a frequency modulated clock generator where the modulation input is a waveform that causes the output spectrum to be spread over a relatively wide range of frequencies resembling a pink noise spectrum. The power spreading serves to reduce the peak power of the harmonics due to the power conserving nature of frequency modulation and, when peak power is reduced below the noise floor level of the receiving equipment, the problem is eliminated. Currently, implementations of this alternative require the additional waveform generating circuitry.

SUMMARY OF THE INVENTION

The present invention is for a spread spectrum data processor clock having reduced harmonic interference. A noise signal is obtained from the data processor and used to control the output frequency of an oscillating means. The modulated output is then provided as the clock oscillator input of the data processor.

DETAILED DESCRIPTION OF THE DRAWINGS

Figure 1:
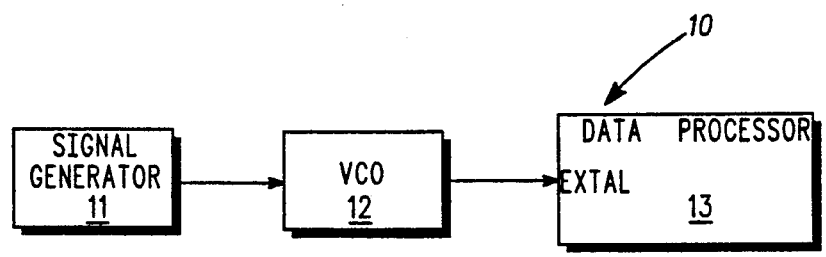
FIG. 1 is a block diagram of a spread spectrum data processor clock using frequency spreading.

Referring initially to FIG. 1, a block diagram of a spread spectrum data processor clock circuit, generally designated 10, is illustrated. Circuit 10 consists of a signal generator 11, a voltage controlled oscillator (VCO) 12, and a data processor 13. Signal generator 11 produces a noise signal which is input to VCO 12 at a modulation input. This signal input is used to modulate the output of VCO 12 causing the clock signal to be spread out over a limited frequency range. While reducing the clock signal for a specific frequency, the total power of the clock signal is still present. This reduction in power at the specific frequency causes an additional reduction in the power of the harmonics, causing them to drop below a noise threshold level and eliminate the self quieting problem.

A drawback of circuit 10 is that signal generator 11 requires additional circuitry to be placed on a printed circuit board (PCB) which is already very limited in the amount of available space.

Figure 2:
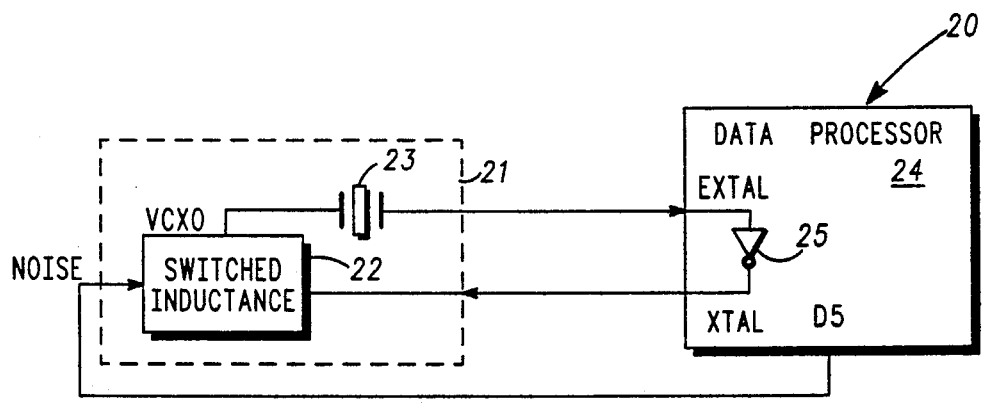
FIG. 2 is a block diagram of a spread spectrum data processor clock using a frequency spreading circuit embodying the present invention.

Referring now to FIG. 2, a block diagram of a spread spectrum data processor clock circuit, generally designated 20, embodying the present invention is illustrated. Circuit 20 consists essentially of a voltage controlled oscillating means, here a voltage controlled crystal oscillator tank (VCXO) 21, and a data processor 24, such as the 68HC11 manufactured by Motorola Inc. Data processor 24 has a crystal oscillator output (XTAL), an external crystal oscillator input (EXTAL), an internal oscillation amplifier means 25, and an output providing a noise signal.

The crystal oscillator output of processor 24 is coupled to an input of a switched inductance 22 of VCXO 21. The output of switched inductance 22 is coupled to a switched inductance 22. A modulation input to switched inductance 22 is coupled to the noise output of processor 24. The output of oscillator crystal 23 is coupled to the EXTAL input of processor 24.

The noise output signal derived from processor 24 may be taken from any of several outputs. The key importance is that the output signal be a random noise type of signal. In one preferred embodiment, the noise signal was taken from a data line. In another preferred embodiment, the noise signal was taken from an address line. By providing a random noise signal to the modulation input of switched inductance 22, the clock signal input to the EXTAL input of processor 24 is varied randomly about a limited clock frequency. The end result being that the various harmonics associated with clock signal have power level below the noise level and will not cause the self quieting problem.

Figure 3:
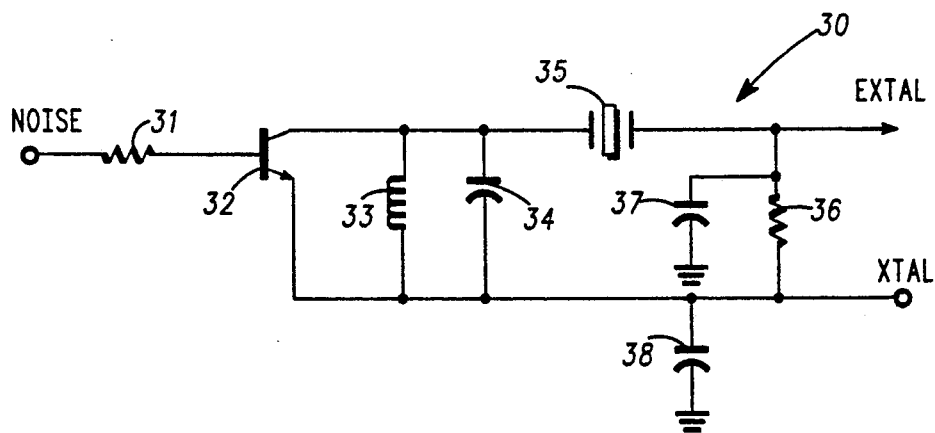
FIG. 3 is a schematic diagram of the frequency spreading circuit of FIG. 2.

In FIG. 3, a schematic diagram of a circuit, generally designated 30, of a preferred embodiment of VCXO 21 of FIG. 2 is illustrated. Circuit 30 consists of a first resistor 31 having a value of 10 K ohms. One end of resistor 31 is coupled to the noise input from processor 24. The other end of resistor 31 is coupled to the base of a transistor 32, such as the 3904 manufactured by Motorola Inc. Across the collector and emitter of transistor 32 is a first inductor 33 (22 uH) and a first capacitor 34 (6.8 pf).

The noise input from processor 24 is provided by a data line (data line D5 in the present example) of the data bus. The first end of an oscillator crystal 35 (7.9488 mHz) is coupled to the collector of transistor 32. A second resistor 36 (1M ohm) is coupled at one end to the EXTAL input and the second end of oscillator crystal 35 and at the second end to the emitter of transistor 32 and the XTAL.

A second capacitor 37 (15 pf) is coupled between the EXTAL input and ground and a third capacitor 38 (16 pf) is coupled between the XTAL output and ground.

Therefore, a means has been shown which reduces the unwanted harmonics of the clock signal which cause self quieting.

Thus, it will be apparent to one skilled in the art that there has been provided in accordance with the invention, a spread spectrum data processor clock that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A spread spectrum data processor clock comprising:
   means for providing a digital noise output from a data processor; and
   oscillator means, modulated by said digital noise output, for providing a clock signal for clocking said data processor.

2. The spread spectrum data processor clock of claim 1 wherein said data processor comprises a microcontroller.

3. The spread spectrum data processor clock of claim 1 wherein said oscillator means comprises an oscillator tank coupled to an oscillation amplifier means.

4. The spread spectrum data processor clock of claim 3 wherein said oscillator tank comprises a voltage controlled oscillator tank.

5. The spread spectrum data processor clock of claim 1 wherein said oscillator means comprises:
   an oscillation amplifier means for said data processor having an input coupled to an oscillator input of said data processor and an output end coupled to an oscillator output of said data processor;
   a first resistor having a first end coupled to said digital noise output of said data processor and a second end;
   a transistor having a base coupled to said second end of said first resistor, a collector, and an emitter coupled to said oscillator output of said data processor;
   an inductor having a first end coupled to said collector of said transistor and a second end coupled to said oscillator output of said data processor;
   a first capacitor having a first end coupled to said collector of said transistor and a second end coupled to said oscillator output of said data processor;
   an oscillator crystal having an input coupled to said collector of said transistor and an output coupled to said oscillator input of said data processor;
   a second resistor having a first end coupled to said oscillator output of said data processor and a second end coupled to said oscillator input of said data processor;
   a second capacitor having a first end coupled to said oscillator output of said data processor and a second end coupled to a ground; and
   a third capacitor having a first end coupled to said oscillator input of said data processor and a second end coupled to a ground.

6. The spread spectrum data processor of claim 1 wherein said digital noise output is provided from one of an address line, a data line and a control line of said data processor.

7. A spread spectrum data processor clock comprising:
   means for providing a digital noise output from a data processor;
   oscillator means for providing an output signal in response to an oscillator output signal of said data processor; and
   means for frequency modulating said output signal of said oscillator means with said digital noise output to provide a clock signal for clocking said data processor.

8. The spread spectrum data processor clock of claim 7 wherein said data processor comprises a microcontroller.

9. The spread spectrum data processor clock of claim 7 wherein said digital noise output is provided from one of an address line, a data line, and a control line of said data processor.

10. A spread spectrum data processor clock comprising:
    a data processor having a digital noise output, an oscillator output coupled to an output of an oscillation amplifier means of said data processor, and an oscillator input coupled to an input of said oscillation amplifier means;
    a first resistor having a first end coupled to said digital noise output of said data processor and a second end;
    a transistor having a base coupled to said second end of said first resistor, a collector, and an emitter coupled to said oscillator output of said data processor;
    an inductor having a first end coupled to said collector of said transistor and a second end coupled to said oscillator output of said data processor;
    a first capacitor having a first end coupled to said collector of said transistor and a second end coupled to said oscillator output of said data processor;
    an oscillator crystal having an input coupled to said collector of said transistor and an output coupled to said oscillator output of said data processor;
    a second resistor having a first end coupled to said oscillator output of said data processor and a second end coupled to said oscillator input of said data processor;
    a second capacitor having a first end coupled to said oscillator output of said data processor and a second end coupled to a ground; and
    a third capacitor having a first end coupled to said oscillator input of said data processor and a second end coupled to a ground.

11. The spread spectrum data processor clock of claim 10 wherein said data processor comprises a microcontroller.

12. The spread spectrum data processor clock of claim 10 wherein said digital noise output is provided from one of an address line, a data line, and a control line of said data processor.

* * * * *